United States Patent [19]

Molitor et al.

[11] Patent Number: 4,674,751

[45] Date of Patent: Jun. 23, 1987

[54] GOLF BALL HAVING IMPROVED PLAYABILITY PROPERTIES

[75] Inventors: Robert P. Molitor, Niles, Mich.; Terence Melvin, Sommers, Conn.; John L. Nealon, Springfield; David W. Dreifus, Longmeadow, both of Mass.

[73] Assignee: Spalding & Evenflo Companies, Inc., Chicopee, Mass.

[21] Appl. No.: 858,958

[22] Filed: May 2, 1986

Related U.S. Application Data

[63] Continuation-in-part of Ser. No. 680,087, Dec. 10, 1984, abandoned.

[51] Int. Cl.$^4$ .............................................. A63L 37/12
[52] U.S. Cl. ................................ 273/235 R; 273/218; 273/DIG. 22; 273/DIG. 24; 525/127; 525/130
[58] Field of Search ................. 525/127, 130; 273/218, 273/233, 234, 235 R

[56] References Cited

U.S. PATENT DOCUMENTS

| | | | |
|---|---|---|---|
| 3,034,791 | 5/1962 | Gallagher | 273/235 R |
| 3,130,102 | 4/1964 | Watson et al. | 156/228 |
| 3,359,231 | 12/1967 | Kent | 524/493 |
| 3,362,937 | 1/1968 | Kent | 427/393.5 |
| 3,384,612 | 5/1968 | Brandt et al. | 428/407 |
| 3,534,965 | 10/1970 | Harrison et al. | 273/218 |
| 3,940,146 | 2/1976 | Little | 273/235 R |
| 3,974,238 | 8/1976 | Schweiker et al. | 273/220 |
| 3,979,126 | 9/1976 | Dusbiber | 273/218 |
| 3,989,568 | 11/1976 | Isaac | 156/182 |
| 4,123,061 | 10/1978 | Dusbiber | 273/220 |
| 4,185,831 | 1/1980 | Tominaga | 273/235 R |
| 4,234,184 | 11/1980 | Deleens et al. | 273/235 R |
| 4,248,432 | 2/1981 | Hewitt et al. | 273/235 R |
| 4,295,652 | 10/1981 | Saito et al. | 273/235 R |
| 4,323,247 | 4/1982 | Keches et al. | 273/235 R |
| 4,337,946 | 7/1982 | Saito et al. | 273/225 |
| 4,337,947 | 7/1982 | Saito et al. | 273/235 R |
| 4,398,000 | 8/1983 | Kataoka et al. | 525/437 |
| 4,423,185 | 12/1983 | Matsumoto et al. | 585/312 |

FOREIGN PATENT DOCUMENTS

| | | |
|---|---|---|
| 1087566 | 10/1967 | United Kingdom . |
| 1163662 | 9/1969 | United Kingdom . |
| 1210698 | 10/1970 | United Kingdom . |
| 1209032 | 10/1970 | United Kingdom . |
| 1345151 | 1/1974 | United Kingdom . |
| 1383422 | 2/1975 | United Kingdom . |

Primary Examiner—Lewis T. Jacobs
Assistant Examiner—A. L. Carrillo
Attorney, Agent, or Firm—Lahive & Cockfield

[57] ABSTRACT

Disclosed is a golf ball having improved short iron and wood playability and improved puttability relative to conventional, ionomer covered balls. The golf balls comprise a novel cover which is far more durable than balata-covered balls yet closely approach or exceed their playability characteristics. The cover comprises a blend of a thermoplastic urethane having a Shore A hardness less than 95 and an ionomer having a Shore D hardness greater than 55. The relative amounts of the urethane and ionomer are set so that the cover has a Shore C hardness within the range of 70 to 85, most preferably 72 to 76.

23 Claims, No Drawings

GOLF BALL HAVING IMPROVED PLAYABILITY PROPERTIES

REFERENCE TO RELATED APPLICATIONS

This application is a continuation-in-part of copending application Ser. No. 680 087 filed Dec. 10, 1984, now abandoned.

BACKGROUND OF THE INVENTION

This invention relates to golf balls and more particularly to an improved golf ball cover useful in making balls, particularly two-piece balls, having superior short iron and other playability characteristics.

Balata and blends of balata with elastomeric or plastic materials were for many years the materials of choice in the manufacture of covers for top grade golf balls These materials have good molding properties and accordingly could be readily compression molded about a spherical wound core to produce a high quality golf ball. An experienced player can apply spin to a balata covered wound ball such that it will fade or draw in flight or have the backspin necessary to stop aburptly on the green. These playability properties are most important in short iron play and can be exploited significantly only by relatively skilled players.

Balata and its synthetic substitutes, trans polybutadiene and trans polyisoprene, have today essentially been replaced by new materials. With the exception of a few lines of golf balls distributed through pro shops to professional golfers and those who would emulate them, newer synthetic polymers are the cover materials of choice.

Of the new synthetics, by far the most commonly used are a line of ionomers sold by E. I. Dupont de Nemours & Company under the trademark SURLYN. These materials comprise copolymers of olefins, typically ethylene, with an alpha, beta, ethylinically unsaturated carboxylic acid such as methacrylic acid. Metal ions such as sodium or zinc are used to neutralize some portion of the acidic groups in the copolymer resulting in a thermoplastic elastomer which has several advantages including a cost advantage over balata. The ionomers may be manufactured with a wide variety of properties by altering the identity of the comonomers, the fraction of the polymer comprising the carboxylic acid, the molecular weight of the polymer, the degree of neutralization of the polymer, and the identity of the metal ions used. Control of these parameters results in ionomer resins of different melt index, hardness, resilience and other mechanical properties which, in a golf ball cover, affect cut resistance, shear resistance, general durability, and resilience.

U.S. Pat. No. 3,819,768 to R. P. Molitor discloses that blends of sodium neutralized ionomer resins with zinc neutralized ionomer resins, as a class, have certain advantages which have not been achievable in any other way. Among these is the production of an unexpectedly high coefficient of restitution of golf balls having the blended ionomer cover. Such covers also resist cold cracking, have excellent aging properties, and are unexpectedly durable. The development of the SURLYN blended cover has been a major factor in the production of two-piece balls having covers which for all practical purposes cannot be cut in play, and which travel further when hit than any other USGA regulation ball as measured by controlled tests when hit by golfers or testing machines.

While the balata-covered, thread-wound balls are easily cut and very expensive, they nevertheless have excellent short iron playability. It is much more difficult to impart spin to an ionomer covered two-piece ball. Frequently, experienced players note that the ionomer covered two-piece balls have an unsatisfactory "feel".

The patent literature is replete with proposed cover formulations seeking to improve upon the balata and ionomer covers which have been commercially successful. Polyurethanes, thermoplastic rubbers, various block copolymers, polyesters, and polyamides, as well as various blends including such materials, have been proposed. Examples include: U.S. Pat. Nos. 3,359,231, 4,398,000, 4,234,184, 4,295,652, 4,248,432, 3,989,568, 3,310,102, 4,337,947, 4,123,061, and 3,490,246.

The manufacture of two-piece balls i.e., balls comprising a solid, molded, resilient core and a cover, has many significant advantages over the more expensive wound balls. There is accordingly a need for two-piece balls having short iron playability characteristics comparable to wound, balata-covered balls. Such covers must have an appropriate hardness to permit the accomplished golfer to impart proper spin. In addition, it should have a resilience when formulated to have the proper hardness value consistent with a high coefficient of restitution. Also, it must be readily manufactured in large volumes at low cost, have an appropriate specific gravity, and have a desireable white color.

SUMMARY OF THE INVENTION

It has now been discovered that a key to manufacturing a two-piece ball having playability properties similar to wound, balata-covered balls is to provide about an inner resilient molded core a cover having a shore C hardness less than 85, preferably 70-80, and most preferably 72-76. The novel cover of the golf ball of the invention is made of a composition comprising a blend of (1) a thermoplastic urethane having a shore A hardness less than 95 and (2) an ionomer having a shore D hardness greater than 55. The ionomer comprises olefinic groups having two to four carbon atoms copolymerized with acrylic or methacrylic acid groups and cross-linked with metal ions, preferably sodium or zinc ions. The primary components of the blended cover are set at a weight ratio so as to result in a cover material after molding having a shore C hardness within the range of 70 to 85, preferably 72 to 76. Preferably, the urethane component of the cover material has a tensile strength greater than 2500 psi and an elongation at break greater than 250%. A preferred cover material comprises about 8 parts of the thermoplastic urethane and between 1 and 4 parts ionomer. Preferably, the cover is no greater than 0.060 inch thick. Thinner covers appear to maximize the short iron Playability characteristics of the balls The cover composition of the invention may be used in connection with the manufacture of thread-wound balls, but is Preferably used in the manufacture of balls having molded cores. Two-piece balls made with the cover of the invention have short iron playability properties as good as or better than balata-covered wound balls but are significantly more durable. They also have better wood playability properties than conventional two-piece balls, and permit experienced golfers to apply spin so as to fade or draw a shot. Puttability is also improved.

Tests have shown that the spin rate off a nine iron of two-piece balls comprising the cover material of the invention is about 9,550 rpm vs. about 5,400 rpm for state of the art, two-piece balls having ionomer covers. This compares favorably to balata-covered wound balls which under the same hitting conditions have a spin rate of about 9,700 rpm. The phrase "two-piece ball" as used herein refers primarily to balls consisting of a molded core and a cover, but also includes balls having a separate solid layer beneath the cover as disclosed, for example, in U.S. Pat. No. 4,431,193 to Nesbitt, and other balls having non-wound cores.

The increased spin that can be applied during a proper hit to balls having the cover of the invention is believed to be due primarily to the softness of the blended cover material. On impact, the cover deforms significantly more than balls having ionomer covers, and tests have shown that there is a greater area of contact between the ball and the club face. This permits the better player to impart fade, draw, or backspin to the ball as the situation dictates, and permits the player to execute better chips and other shots to the green. On shots of short-range, e.g., less than 50 yards, the two-piece balls of the invention often outperform balata-covered wound balls. Regarding puttability, two-piece balls including the cover of the invention have a lower drop rebound relative to conventional two-piece balls, and have increased contact time on the putter face. These characteristics combine to enable the player better to control the putting line and distance.

The preferred components of the cover material comprise a thermoplastic polyurethane consisting essentially of linear primary polymer chains. The structure of such chains preferably comprises long, flexible chain segments joined end to end by rigid chain segments through covalent chemical bonds. The flexible segments typically are diisocyanate-coupled, low melting polyester or polyether chains. The rigid segments include single diurethane bridges and high melting urethane chain segments formed by the reaction of diisocyanate with small glycols. Hydrogen bonding and other attractive forces among the rigid chain segments are believed to produce domains which are mutually attractive, behave somewhat like cross-links, and are reversible with heat and with solvation.

The preferred second component of the cover composition is an ionomer comprising olefinic groups having two or four carbon atoms copolymerized with acrylic or methacrylic acid groups which are at least partially neutralized with a sodium or zinc ion, e.g., a SURLYN ionomer. Inclusion of the ionomer imparts to the cover a degree of cut resistance far in excess of balata and helps to control the melt index of the blend to facilitate molding.

The cover composition of the invention may be used to formulate golf ball covers by injection or compression molding about wound cores, solid molded cores of known composition, high coefficient molded cores such as those disclosed in copending application Ser. No. 680,088, filed Dec. 10, 1984, or cores or the type claimed in copending application Ser. No. 680,085, filed Dec. 10, 1984, which has an inner, hard central portion and a soft outer layer. Various combinations of the solid core technologies may also be used.

Accordingly, it is an object of the invention to provide a cover composition which can be injection molded or compression molded about a solid molded core to produce golf ball covers which are more durable and cut resistant than balata rubber-covered balls Another object is to provide a two-piece ball having short iron and other playability characteristics equal to or exceeding thread-wound balata-covered balls Another object is to provide a cover composition compatible with urethane-based paints which resists chipping and peeling. Another object is to produce a cover for a two-piece ball which may be easily manufactured to be cut resistant and to have an improved combination of hardness and resilience properties, thereby providing a two-piece ball havinq both hiqh resilience and short iron playability.

These and other objects and features of the invention will be apparent from the following description and from the claims.

DESCRIPTION

The cover composition of the invention in its broadest aspects comprises a blend of a thermoplastic urethane having a shore A hardness less than 95 together with an ionomer resin having a shore D hardness greater than 55 at weight ratios sufficient to result in a golf ball cover having a shore C hardness within the range of 70 to 85, preferably within the range of 70 to 80, and most preferably 72 to 76.

The thermoplastic urethanes useful in the cover preferably consist essentially of linear primary polymer chains having a preponderance of relatively long, flexible chain segments joined end to end by rigid chain segments through covalent chemical bonds. The flexible segments may be diisocyanate coupled, low melting polyester or polyether chains. The rigid segments include single diurethane bridges resulting when a diisocyanate couples to polyester or polyether molecules. The rigid segments may comprise longer high melting urethane chain segments formed by the reaction of diisocyanate with a low molecular weight glycol chain extender component.

The polar nature of the recurring rigid, urethane chain segments results in their strong mutual attraction, aggregation, and ordering into crystalline and polycrystalline domains in the mobile polymer matrix. Urethane hydrogen atoms and carbonyl and ether oxygen partners are believed to permit extensive hydrogen bonding among the polymer chains. This apparently restricts the mobility of the urethane chain segments in the domains. These attractions and chain entanglements produce thermo-labile pseudo cross-links and produce resins which can display the superficial properties of strong rubbery vulcanizates. Preferred thermoplastic urethanes in the cover composition of the invention have a tensile strength of at least 2500 lb/in$^2$ and an elongation at break of at least 250 percent. Most preferably, tensile strength and elongation at break are 4000 lb/in$^2$ and 400 percent, respectively.

Such materials are available commercially from Mobay Chemical Company under the trademark TEXIN, from B.F. Goodrich under the trademark ESTANE, from Upjohn Company under the trademark PELLETHANES, or from K.J. Quinn Company under the trademark Q THANES. Mobay Chemical Company's TEXIN 480AR is the currently preferred thermoplastic urethane for use in the composition of the invention. TEXIN 591A may also be used.

The other major component of the cover composition is an ionomer resin comprising a copolymer of an olefin having one to four carbon atoms with a monocarboxylic, typically acrylic or methacrylic, acid, at least partially neutralized with a metal ion. These materials are sold under the trademark SURLYN by E.I. Dupont de Nemours Co. and, as noted previously, come in a wide variety of grades which differ in average molecular weight, percent carboxylic acid monomer, degree of neutralization, identity of neutralizing ion, and other factors. Any of the SURLYN ionomers or other ionomers of the type described having a shore D hardness of at least 55 may be used. The currently preferred material is SURLYN 1702. SURLYN 1702 is a copolymer of ethylene and methacrylic acid which is believed to comprise about 96.5% free acid and 1.2% zinc. Its average melt index is about 14.

The presence of the ionomer in the blend serves to set the melt flow index to optimal levels for injection or compression molding and also imparts cut resistence and general durability to covers made with the blend.

The urethane and ionomer resin components thus coact in use to provide a unique combination of durability, playability, and ease of manufacture. The rheological properties of the blend when melted are well suited for molding covers on a commercial scale. The blend is naturally white enough so that with proper pigment additives the balls may be clear coated without painting. The nature of the cover material is such that better players can fade, draw, or apply backspin to the ball even though it is of two-piece construction, yet the cover is more cut resistant and has generally better durability than balata-covered wound balls. It is believed that the primary reason why more spin can be given to the ball during a hit is that the cover material deforms more easily than do ionomer covers. Thus, irons, particularly short irons, tend to "bite" into the ball without permanently deforming it.

The nature of the molded cores which may be used with the cover form no part of this invention, although molded cores are preferred over wound cores because of their lower cost and superior performance. Thus the covers of the invention may be used with cores of the type described in U.S. Pat. Nos. 4,264,075, 4,169,599, or 4,141,559.

Conventional solid cores are typically compression molded from a slug of uncured or lightly cured elastomer composition comprising a high cis content polybutadiene and a metal salt of an alpha, beta, ethylinically unsaturated carboxylic acid such as zinc mono or di acrylate or methacrylate. To achieve high coefficient of restitution in the core, manufacturer include a small amount of a metal oxide such as zinc oxide. Larger amounts of metal oxide than are needed to achieve coefficient may be included to increase core weight so that the finished ball more closely approaches the USGA upper weight limit of 1.620 ounce. Other materials may be used in the core composition including compatible rubbers or ionomers, and low molecular weight fatty acids such as stearic acid. Free radical initiator catalysts such as peroxides are admixed with the core composition so that, on the application of heat and pressure, a complex curing or cross-linking reaction takes place.

Copending application Ser. No. 680,088, filed on the same day as the parent of this application, discloses a golf ball core that is cured with a peroxide and a polyfunctional isocyanate. Balls having cores made using a small amount of such as isocyanate, preferably a diisocyanate, e.g., 1.0%, 4.4' diphenyl methane diisocyanate, have an improved, higher coefficient of restitution. Coefficient of restitution is defined as the ratio of outgoing to incoming velocity of the test core or ball projected against a hard Plate at a selected initial velocity, e.g., 125 ft./sec. The composition may otherwise be identical to prior art polybutadiene-metal acrylate core compositions. These cores may be used with the cover composition of the invention to produce a ball of high coefficient and high initial velocity, closely approaching the USGA limit, which nevertheless has excellent short iron playability properties.

Copending application Ser. No. 680,088, filed on the same day as the parent of this application, discloses a core consisting of a hard, inner central portion and a softer outer layer. The core may be manufactured by formulating a conventional core composition of the type described above, extruding slugs of the proper size, applying a material which alters cross-linking to surface layers of the slug, e.g., sulfur or sulfur bearing materials, and then compression molding. Inner portions of the core cure in the normal way to produce a hard, resilient center. An outer layer of the core, at least about 0.20 inches thick, is cured differently because of the presence of the sulfur or sulfur bearing material to produce a soft outer region, e.g., having a Shore A hardness of about 35. This type of core may also be used with the cover of this invention to produce balls of excellent short iron playability characteristics.

The invention will be further understood from the following non-limiting examples.

A cover composition according to the present invention was made by blending 80 parts TEXIN 480AR thermoplastic urethane (Mobay), 20 parts SURLYN 1702 (Dupont) and 0.4 parts $TiO_2$. After thorough blending, the cover stock had a melt flow index of 0.89. It was injection molded about conventional cores of the type described above at approximately 450 degrees F. to produce covers 0.060 in. thick. The balls were painted and their properties were tested versus a golf ball of similar construction, except that the cover material was a blend of a sodium ionomer with a zinc ionomer, and versus a wound ball having a balata cover.

Off a nine iron, balls having the cover of the invention had a spin rate of 9550 rpm, whereas ionomer covered balls had a spin rate of 5400 rpm and the balata oovered balls a spin rate of 9700 rpm. When "bladed" with a three iron, the balls of the invention are very slightly bruised, the ionomer covered balls are unmarked, and the balata covered ball is cut through to the threads. When tested by professional golfers, the balls of the invention were preceived as being equal or superior to balata covered balls for short iron playability.

A series of cover formulations were made and molded about identical one-piece cores. In these examples, the type of thermoplastic urethane and the type of ionomer used in the blend was varied, or one one of two components was eliminated, to demonstrate the effect on hardness and coefficient of the resulting golf balls. The examples also provide further teaching to those skilled in the art in the formulation of covers embodying the invention. The covers were manufactured generally as set forth in the example above using the ingredients and yielding the results set forth below.

TABLE

| | Sample No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Cover | | | | | | | | | | | | |
| Texin 480 AR (86 ± 3)[1] | 100 | — | — | 90 | 80 | 70 | 80 | 80 | — | — | — | — |
| Surlyn 1702 (62)[2] | — | — | — | 10 | 20 | 30 | — | — | 10 | 10 | 20 | 20 |
| Surlyn 1706 (64)[2] | — | — | — | — | — | — | 20 | — | — | — | — | — |
| Surlyn 1605 (65)[2] | — | — | — | — | — | — | — | 20 | — | — | — | — |
| Elastollan 90 (90)[1] | — | 100 | — | — | — | — | — | — | 90 | — | 80 | — |
| Goodrich X-4128 (93)[1] | — | — | 100 | — | — | — | — | — | — | 90 | — | 80 |
| Titanium dioxide | 5 | 5 | 5 | 5 | 5 | 5 | 5 | 5 | 5 | 5 | 5 | 5 |
| Fluorescent brightner | 0.10 | 0.10 | 0.10 | 0.10 | 0.10 | 0.10 | 0.10 | 0.10 | 0.10 | 0.10 | 0.10 | 0.10 |
| Antioxidant | 0.17 | 0.17 | 0.17 | 0.17 | 0.17 | 0.17 | 0.17 | 0.17 | 0.17 | 0.17 | 0.17 | 0.17 |
| Pigment | 0.02 | 0.02 | 0.02 | 0.02 | 0.02 | 0.02 | 0.02 | 0.02 | 0.02 | 0.02 | 0.02 | 0.02 |
| Release agent | 1.00 | 1.00 | 1.00 | 1.00 | 1.00 | 1.00 | 1.00 | 1.00 | 1.00 | 1.00 | 1.00 | 1.00 |
| Finished Ball Data | | | | | | | | | | | | |
| Weight | 45.2 | 45.3 | 44.9 | 45.1 | 44.7 | 44.5 | 45.0 | 44.8 | 45.1 | 44.8 | 44.4 | 44.5 |
| Compression | 74 | 70 | 72 | 72 | 70 | 73 | 73 | 70 | 69 | 71 | 72 | 74 |
| Coefficient | .791 | .788 | .793 | .791 | .794 | .787 | .793 | .795 | .789 | .790 | .785 | .789 |
| Shore C Hardness | 69 | 80 | 74 | 71 | 73 | 76 | 73 | 73 | 82 | 76 | 84 | 78 |

[1]Shore A hardness;
[2]Shore D hardness; Elastollan 90A is a thermoplastic polyester-type urethane available commercially from BASF; Goodrich X-4128 is a thermoplastic polyester-type urethane available commercially from B. F. Goodrich.

Cover sample number 4 is most preferred. Samples Nos. 1, 2, and 3 are not embodiments of the invention. Sample No. 6 presented molding difficulties. Sample No. 7, 8, and 10 constitute preferred embodiments, with a Shore C hardness within the range of 72-76. Sample 4 illustrates a soft covered ball exemplifying the lower range of softness in covers embodying the invention. Samples 9, 11 and 12 illustrate hard covered balls exemplifying the upper range of softness in covers embodying the invention.

It should be understood that other materials may be included in the cover in addition to the essential urethane and ionomer resins discussed above, provided the cover is formulated to have the requisite Shore C hardness. For example, the hardness of a given cover embodying the invention may be adjusted slightly, and its other properties may be modified by introducing into the blend compatible thermoplastic resins such as polycarbonates.

The invention may be embodied in other specific forms without departing from the spirit and scope thereof Accordingly, other embodiments are within the following claims

What is claimed is:

1. A composition of matter for molding a cover for a golf ball, said composition comprising a thermoplastic urethane polymer and said having a Shore A hardness less than 95 and an ionomer comprising olefinic groups having 2 to 4 carbon atoms copolymerized with a monocarboxylic acid having 3 to 4 carbon atoms, said acid groups being at least partially neutralized with a metal ion, said ionomer having a Shore D hardness greater than 55, the relative amounts of said urethane polymer and said ionomer being sufficient to produce a cover having a Shore C hardness within the range of 70 to 85.

2. The composition of claim 1 wherein the relative amounts of said urethane polymer and said ionomer are sufficient to produce a cover having a Shore C hardness within the range of 70 to 80.

3. The composition of claim 1 wherein the relative amounts of said urethane polymer and said ionomer are sufficient to produce a cover having a Shore C hardness within the range of 72 to 76.

4. The composition of claim 1 wherein said ionomer is neutralized with a metal selected from the group consisting of sodium and zinc.

5. The composition of claim 1 comprising 8 parts of said urethane polymer and between 1 and 4 parts of said ionomer.

6. The composition of claim 1 further comprising titanium dioxide.

7. The composition of claim 1 wherein said urethane polymer has a tensile strength of at least 2500lb/in$^2$ and an elongation at break greater than 250 percent.

8. In a golf ball having a core and a cover, the improvement wherein the cover comprises a blend of a thermoplastic urethane polymer having a Shore A hardness less than 95 and an ionomer having a Shore D hardness greater than 55, said ionomer comprising olefinic groups having 2 to 4 carbon atoms copolymerized with acrylic or methacrylic acid groups, said acid groups being at least partly neutralized with a metal ion, the relative amounts of said urethane polymer and said ionomer being sufficient to produce a cover having a Shore C hardness within the range of 70 to 85.

9. The improvement of claim 8 wherein the relative amounts of said urethane polymer and said ionomer are sufficient to produce a cover having a Shore C hardness within the range of 70 to 80.

10. The improvement of claim 8 wherein the relative amounts of said urethane polymer and said ionomer are sufficient to produce a cover having a Shore C hardness within the range of 72 to 76.

11. The improvement of claim 8 wherein said core comprises a molded, resilient, solid sphere.

12. The improvement of claim 8 wherein said ionomer is neutralized with a metal selected from the group consisting of sodium and zinc.

13. The improvement of claim 8 comprising 8 parts of said urethane polymer and between 1 and 4 parts of said ionomer.

14. The improvement of claim 13 comprising about 2 parts of said ionomer.

15. The improvement of claim 8 wherein said cover has a thickness no greater than 0.60 inch.

16. The improved golf ball of claim 8 characterized in that it has a spin rate when hit with a nine iron greater than 9,000 rpm.

17. A golf ball cover comprising a blend of a thermoplastic urethane polymer having a Shore A hardness less than 95 and an ionomer comprising olefinic groups having 2 to 4 carbon atoms copolymerized with a monocarboxylic acid having 3 to 4 carbon atoms, said acid groups being at least partially neutralized with a metal ion, said ionomer having a Shore D hardness greater than 55, the relative amounts of said urethane polymer and said ionomer being sufficient to produce a cover having a Shore C hardness within the range of 70 to 85.

18. The cover of claim 17 wherein the relative amounts of said urethane polymer and said ionomer are sufficient to produce a cover having a Shore C hardness within the range of 70 to 80.

19. The cover of claim 17 wherein the relative amounts of said urethane polymer and said ionomer are sufficient to produce a cover having a Shore C hardness within the range of 72 to 76.

20. The cover of claim 17 wherein said ionomer is neutralized with a metal selected from the group consisting of sodium and zinc.

21. The cover of claim 17 comprising 8 parts of said urethane polymer and between 1 and 4 parts of said ionomer.

22. The cover of claim 17 further comprising titanium dioxide.

23. The cover of claim 17 wherein said urethane polymer has a tensile strength of at least 2500 lb/in$^2$ and an elongation at break greater than 250 percent.

* * * * *